(12) United States Patent
Hu et al.

(10) Patent No.: US 9,554,237 B2
(45) Date of Patent: Jan. 24, 2017

(54) METHOD AND SYSTEM FOR TRANSFERRING ADDRESS BOOK BASED ON BLUETOOTH

(71) Applicant: HUIZHOU TCL MOBILE COMMUNICATION CO., LTD., HuiZhou, Guangdong (CN)

(72) Inventors: Chengjun Hu, HuiZhou (CN); Donghai Wu, HuiZhou (CN); Hanwu Xie, HuiZhou (CN); Jinhan Li, HuiZhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 4 days.

(21) Appl. No.: 14/443,552

(22) PCT Filed: May 30, 2014

(86) PCT No.: PCT/CN2014/078894
§ 371 (c)(1),
(2) Date: May 18, 2015

(87) PCT Pub. No.: WO2015/106522
PCT Pub. Date: Jul. 23, 2015

(65) Prior Publication Data
US 2015/0350812 A1    Dec. 3, 2015

(30) Foreign Application Priority Data

Jan. 20, 2014 (CN) .......................... 2014 1 0024598

(51) Int. Cl.
*H04M 1/00* (2006.01)
*H04W 4/00* (2009.01)
(Continued)

(52) U.S. Cl.
CPC ....... *H04W 4/008* (2013.01); *H04M 1/274516* (2013.01); *H04M 1/7253* (2013.01); *H04L 61/1594* (2013.01); *H04M 2250/02* (2013.01)

(58) Field of Classification Search
USPC .............. 455/412.1, 558, 418, 426.1, 414.1, 415,455/550, 457
See application file for complete search history.

(56) References Cited

U.S. PATENT DOCUMENTS 8,301,197 B2    10/2012 Horodezky et al.
2007/0004457 A1*   1/2007 Han .................. H04W 8/20
                                                                455/558
(Continued)

FOREIGN PATENT DOCUMENTS

CN    101179798 A    5/2008
CN    101730293 A    6/2010
(Continued)

*Primary Examiner* — Ganiyu A Hanidu
(74) *Attorney, Agent, or Firm* — Ladas & Parry LLP

(57) ABSTRACT

A method and system for transferring an address book based on Bluetooth are provided. First, address book information stored in a terminal and a SIM card of a first mobile terminal is transmitted to the second mobile terminal. A second mobile obtains the address hook information in the first mobile terminal. The method and system provided by the present invention make the transfer of the address book information more convenient and efficient, not only improving a user's experience of the mobile terminal but also providing convenience for the user's daily life.

3 Claims, 2 Drawing Sheets

(51) Int. Cl.
*H04M 1/2745* (2006.01)
*H04M 1/725* (2006.01)
*H04L 29/12* (2006.01)

(56) References Cited

U.S. PATENT DOCUMENTS

| | | |
|---|---|---|
| 2007/0050508 A1 | 3/2007 | Shan |
| 2007/0102521 A1* | 5/2007 | Petersson ............... G06Q 10/10 235/462.1 |
| 2009/0265794 A1* | 10/2009 | Apelqvist ............... G06Q 10/10 726/30 |
| 2013/0183940 A1* | 7/2013 | Yang ....................... H04L 51/18 455/412.1 |
| 2013/0260739 A1* | 10/2013 | Saino ..................... G06F 9/547 455/419 |

FOREIGN PATENT DOCUMENTS

| | | |
|---|---|---|
| CN | 102118477 A | 7/2011 |
| CN | 102307056 A | 1/2012 |
| CN | 102647701 A | 8/2012 |
| CN | 102739860 A | 10/2012 |
| CN | 103346821 A | 10/2013 |
| CN | 103795445 A | 5/2014 |
| EP | 2061280 A1 | 5/2009 |
| WO | 2007/012247 A1 | 2/2007 |

\* cited by examiner

METHOD AND SYSTEM FOR TRANSFERRING ADDRESS BOOK BASED ON BLUETOOTH

TECHNICAL FIELD OF THE INVENTION

The present invention relates to a mobile terminal application field, and in particular to a method and system for transferring, backing up and restoring an address book based on Bluetooth.

BACKGROUND OF THE INVENTION

With the rapid development of mobile Internet and the upgrade of mobile phones, in order to pursue a better experience, users now like to replace their phones frequently.

However, many users are bothered by figuring out how to locally back up, restore, and even transfer contact data between two mobile phones. Using the transfer of the contact data between two mobile phones as an example, in the prior art, transferring the address book information from one mobile phone to another mobile phone is achieved generally by combining the mobile phone with a SIM card (abbreviated from Subscriber Identity Module, also called a smart card or a user identification card). The method is: first, to copy the address book information in a mobile phone to the SIM card mounted in the mobile phone, then to install the SIM card to another mobile phone, and then to copy the address book information to the present mobile phone from the SIM card, thereby completing the processes of transferring the address book information from one phone to another phone. As can be seen from the above, the processes are not only cumbersome, but also prone to error during the transferring process.

Therefore, based on the above-mentioned technical problem, there is a significant need to provide a method for conveniently and efficiently transferring the address book information between mobile terminals.

SUMMARY OF THE INVENTION

The technical problem which the present invention needs to solve is, for the above-mentioned disadvantage in the prior art, providing a method and a system for transferring an address book based on Bluetooth, which are capable of establishing a wireless connection between two mobile terminals requiring performing the transfer of the address book information to realize the transfer of the contact information in the address books, thereby providing convenience for the users.

A technical solution of the present invention is implemented as follows.

A method for transferring an address book based on Bluetooth is utilized to transfer address book information from a first mobile terminal to a second mobile terminal. The method includes:

exporting the address book information stored in the first mobile terminal as a file according to a file format standard of electronic business cards;

storing the said file in the first mobile terminal, and deleting a history file of which a format thereof is identical to a format of the said file from history files stored in the first mobile terminal;

establishing a wireless connection between the first mobile terminal and the second mobile terminal via Bluetooth;

sending the said file to the second mobile terminal by the first mobile terminal via a Bluetooth object push profile manner; and receiving the said file by the second mobile terminal, and interpreting the said file according to the file format standard of electronic business cards, and importing the interpreted address book information into the address book of the second mobile terminal.

In the method for transferring an address book based on Bluetooth, the step of exporting the address book information stored in the first mobile terminal as a file according to a file format standard of electronic business cards further includes:

performing the step of establishing the wireless connection between the first mobile terminal and the second mobile terminal via Bluetooth if the said file is exported successfully;

prompting a user whether to re-export the address book information if not, and then ending off the transfer of the address book information if the user chooses not to re-export.

In the method for transferring an address book based on Bluetooth, the step of establishing the wireless connection between the first mobile terminal and the second mobile terminal via Bluetooth is:

turning on a Bluetooth function first by the first mobile terminal, and detecting a wireless signal sent by the second mobile terminal via Bluetooth:

then establishing the wireless connection if the wireless signal of the second mobile terminal is detected;

sending a request message for establishing a wireless communication with the second mobile terminal by the first mobile terminal if the wireless signal of the second mobile terminal is not detected, and establishing the wireless connection after the second mobile terminal receives the request message.

A method for transferring an address book based on Bluetooth is utilized to transfer address book information from a first mobile terminal to a second mobile terminal. The method includes the following steps of:

exporting the address book information stored in the first mobile terminal as a file according to a file format standard of electronic business cards;

establishing a wireless connection between the first mobile terminal and the second mobile terminal via Bluetooth;

sending the said file to the second mobile terminal via a wireless communication by the first mobile terminal;

receiving the said file by the second mobile terminal, and interpreting the said file according to the file format standard of electronic business cards, and importing the interpreted address book information into the address book of the second mobile terminal.

In the method for transferring an address book based on Bluetooth, the step of exporting the address book information stored in the first mobile terminal as a file according to a file format standard of electronic business cards further comprises:

performing the step of establishing the wireless connection between the first mobile terminal and the second mobile terminal via Bluetooth if the said file is exported successfully;

prompting a user whether to re-export the address book information if not, and then ending off the transfer of the address book information if the user chooses not to re-export.

In the method for transferring an address book based on Bluetooth, the step of establishing the wireless connection between the first mobile terminal and the second mobile terminal via Bluetooth is:

turning on a Bluetooth function first by the first mobile terminal, and detecting a wireless signal sent by the second mobile terminal via Bluetooth:

then establishing the wireless connection if the wireless signal of the second mobile terminal is detected;

sending a request message for establishing a wireless communication with the second mobile terminal by the first mobile terminal if the wireless signal of the second mobile terminal is not detected, and establishing the wireless connection after the second mobile terminal receives the request message.

In the method for transferring an address book based on Bluetooth, the step of sending the said file to the second mobile terminal via the wireless communication by the first mobile terminal is:

sending the said file to the second mobile terminal by the first mobile terminal via a Bluetooth object push profile manner.

In the method for transferring an address book based on Bluetooth, the method further includes:

storing the said file in the first mobile terminal, and deleting a history file of which a format thereof is identical to the format of the said file from history files stored in the first mobile terminal.

A system for transferring an address book based on Bluetooth comprises a first mobile terminal and a second mobile terminal.

The first mobile terminal and the second mobile terminal have a Bluetooth module.

The first mobile terminal includes an exporting module of a file format standard of electronic business cards, a first address book module, and a first Bluetooth module.

The second mobile terminal includes a decoding module of the file format standard of electronic business cards, a second address book module, and a second Bluetooth module.

The exporting module of the file format standard of electronic business cards is utilized to export address book information stored in the first address book module of the first mobile terminal as a file according to the file format standard of electronic business cards.

The first address book module is utilized to store contact information of the first mobile terminal.

The first Bluetooth module is utilized to establish a wireless connection with the second Bluetooth module for sending the exported file from the exporting module of the file format standard of electronic business cards to the second mobile terminal.

The second Bluetooth module is utilized to receive the said file transmitted from the first Bluetooth module.

The decoding module of the file format standard of electronic business cards is utilized to interpret the said file received by the second mobile terminal according to the file format standard of electronic business cards, and to import the interpreted address book information into the address book of the second mobile terminal.

In the system for transferring an address book based on Bluetooth, the exporting module of the file format standard of electronic business cards comprises an export determining unit.

The export determining unit is utilized to determine whether the said file is exported successfully:

if the said file is exported successfully, then sending the said file;

if not, then prompting a user whether to re-export the address book information, and then ending off the transfer of the address book information if the user chooses not to re-export.

In the system for transferring an address book based on Bluetooth, before the wireless connection is established between the first mobile terminal and the second mobile terminal, and after the first Bluetooth module is turned on, detection of a wireless signal of the second mobile terminal is performed:

if the wireless signal is detected, then establishing the wireless connection;

if not, then sending a request message for establishing a wireless communication with the second mobile terminal by the first mobile terminal, and establishing the wireless connection after the second mobile terminal receives the request message.

In the system for transferring an address book based on Bluetooth, the Bluetooth module sends out the said file via a Bluetooth object push profile manner.

In the system for transferring an address book based on Bluetooth, the system further includes:

a file storing and deleting module utilized to store the said file in the first mobile terminal, and to delete a history file of which a format thereof is identical to a format of the said file from history files stored in the first mobile terminal.

The present invention brings a beneficial efficacy in making the transfer of the address book information more convenient and faster and providing convenience for the user's daily life, by means of providing the method and system for transferring an address book based on Bluetooth, which utilize the Bluetooth function of the mobile terminal to transfer the address book information from one mobile terminal to another mobile terminal via the way of the wireless communication.

DETAILED DESCRIPTION OF THE INVENTION

The present invention provides a method and system for transferring an address book based on Bluetooth. To make the objectives, technical solutions and advantages of the present disclosure clearer, the present disclosure will be further described below with reference to the attached drawings and embodiments thereof. It should be understood that the specific embodiments described herein are merely utilized to explain the present invention but not to limit the present invention.

Figure 1:
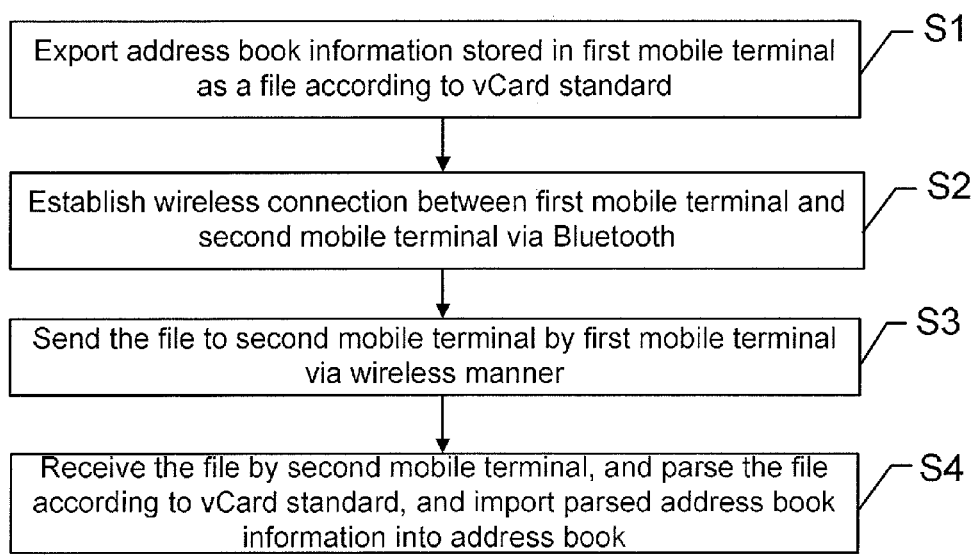
FIG. 1 is a flow chart illustrating a method for transferring an address book based on Bluetooth.

A method for transferring an address book based on Bluetooth is utilized to transfer address book information from a first mobile terminal to a second mobile terminal. As shown in FIG. 1, the method includes the following steps of:

S1, exporting the address book information stored in the first mobile terminal as a file according to a vCard standard (file format standard of electronic business cards).

When a user needs to transfer the address book information in one mobile terminal to another mobile terminal, that is to say, to transfer the address book information stored in one mobile terminal to another mobile terminal, firstly, the address book information stored in the first mobile terminal and the SIM card is exported and then packaged as a file, and the said file is stored in the first mobile terminal.

Specifically, the vCard standard is a standard format for storing contact information in the address book information. The first mobile terminal first converts the contact data stored therein into the file format of the vCard standard that can be identified by other mobile terminals, in order to facilitate the second mobile terminal to interpret out the address book information from the first mobile terminal after receiving the said file.

Executing the next step is expected if the said file is exported successfully, if not, then to prompt a user whether to re-export the address book information, and then to end off the transfer of the address book information if the user chooses not to re-export.

S2, establishing a wireless connection between the first mobile terminal and the second mobile terminal via a Bluetooth module.

After the contact information in the address book information is exported as the said file in the above-mentioned step, a wireless connection is established by the Bluetooth modules of both the first mobile terminal and the second mobile terminal.

More specifically, before the wireless connection is established between the first mobile terminal and the second mobile terminal, the step further includes the following:

First turning on its own Bluetooth function by the first mobile terminal, and detecting the wireless signal sent by the second mobile terminal via Bluetooth, that is, by the way of wireless network search, searching whether the nearby wireless network has a wireless signal with a signal identification of the second mobile terminal. If the wireless signal with the identification of the second mobile terminal is detected, the step chooses to establish the wireless connection with the second mobile terminal. If the wireless signal with the identification of the second mobile terminal is not detected, it indicates that the Bluetooth function of the second mobile terminal is not turned on, or the second mobile terminal is out of the range that it can be searched by the Bluetooth.

After the Bluetooth module of the second mobile terminal is turned on, or after the second mobile terminal is close to the first mobile terminal, the first mobile terminal sends a request message for establishing wireless communication with the second mobile terminal, and the second mobile terminal receives the request message and establishes the wireless connection with the first mobile terminal.

S3, sending by the first mobile terminal of the said file to the second mobile terminal by the Bluetooth module.

After the first mobile terminal and the second mobile terminal establish the wireless connection, the first mobile terminal transmits the said file to the second mobile terminal by the Bluetooth module.

Specifically, the first mobile terminal sends out the said file via a Bluetooth object push profile function.

It is expected that the first mobile terminal will automatically prompt whether to resend the said file if the first mobile terminal cannot send out the said file successfully. If the user chooses to resend the said file, then the first mobile terminal resends the said file. Otherwise, this file transfer is stopped.

S4, receiving and interpreting by the second mobile terminal of the said file according to the vCard standard, and the interpreted address book information is imported into the address book.

The specific step of importing the interpreted address book information into the address book of the second mobile terminal is: importing the contact information of the interpreted address book information one by one into the terminal or the SIM card of the second mobile terminal.

The second mobile terminal receives the said file come from the first mobile terminal via Bluetooth module of the second mobile terminal, and interprets the said file for obtaining the address book information which the said file contains.

Since the said file is packaged in the vCard standard, the said file is a file with a filename extension of vcf format. After the second mobile terminal receives the said file, the second mobile terminal first detects whether the received file includes the address book information, that is, it detects whether the filename extension of the received file is vcf or not. If the filename extension is vcf, then it interprets the said file according to the vCard standard. Otherwise, it quits the said file transfer.

After the second mobile terminal interprets the file, it imports the interpreted contact information one by one into an address book module within the second mobile terminal and stores the newly imported contact information. After the said file is interpreted completely, this transfer process for the address book information is complete.

Figure 2:
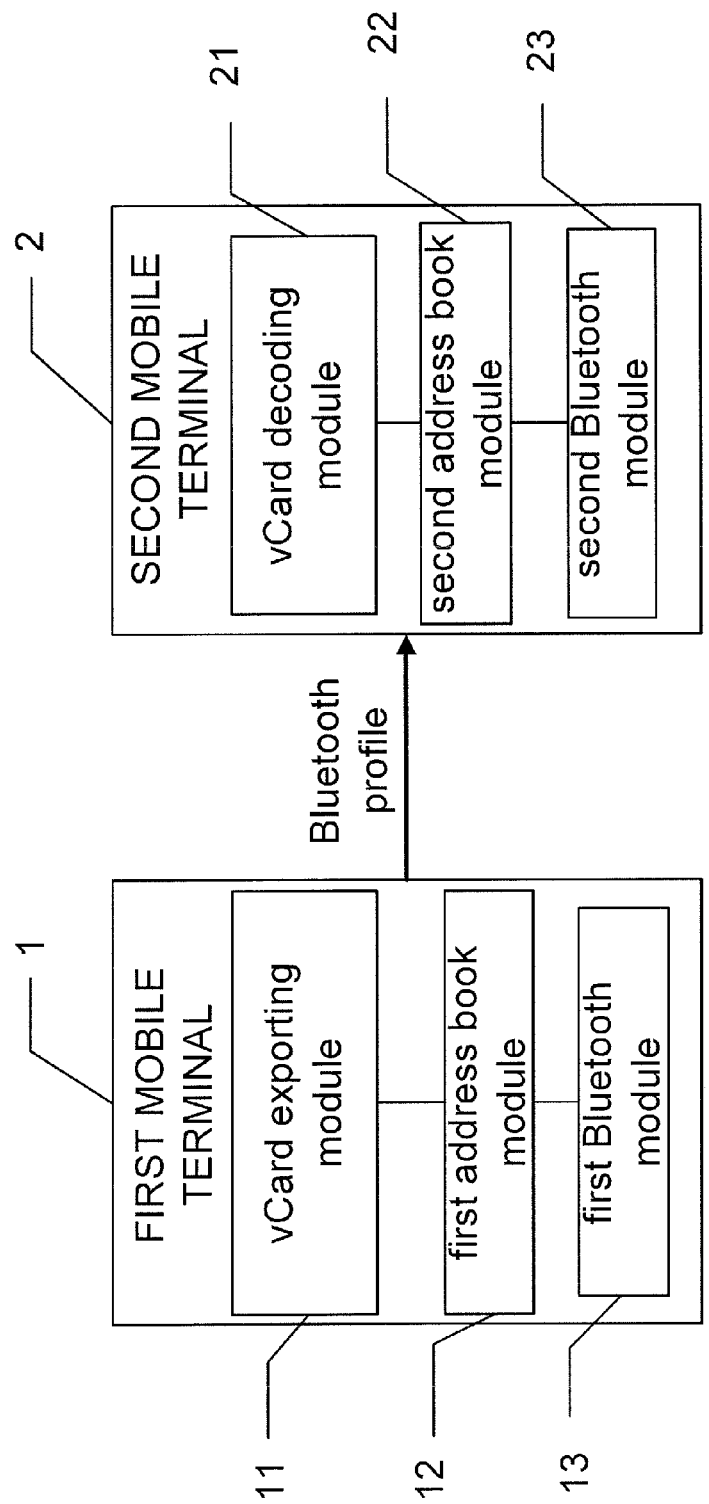
FIG. 2 is a block diagram schematically illustrating a system for transferring an address book based on Bluetooth.

On the basis of the above-mentioned method for transferring the address book information based on Bluetooth, the present invention further provides a system for transferring an address book based on Bluetooth. As shown in FIG. 2, the system includes a first mobile terminal 1 and a second mobile terminal 2.

Both the first mobile terminal and the second mobile terminal have a Bluetooth module.

The first mobile terminal 1 includes a vCard exporting module 11, a first address book module 12, and a first Bluetooth module 13. The second mobile terminal 2 includes a vCard decoding module 21, a second address book module 22, and a second Bluetooth module 23;

The vCard exporting module 11 is utilized to export the address book information of the address book module stored in the terminal and the SIM card of the first mobile terminal 1 as a file according to the vCard standard, and its function has been described as the step S1 of the above-mentioned method.

The first address book module 12 is utilized to store the contact information of the first mobile terminal 1.

The first Bluetooth module 13 is utilized to establish a wireless connection with the second Bluetooth module 23 for sending the exported file from the vCard exporting module 11 to the second mobile terminal 2.

The second Bluetooth module 23 is utilized to receive the said file transmitted from the first Bluetooth module 13.

The vCard decoding module 21 is utilized to interpret the said file received by the second Bluetooth module 13 according to the vCard standard, and to import the interpreted address book information into the address book.

Before the wireless connection is established between the first mobile terminal 1 and the second mobile terminal 2, and after the first Bluetooth module 13 is turned on, the detection of the wireless signal from the second mobile terminal 2 is performed. If the wireless signal is detected, then the wireless connection is established; if not, then the first mobile terminal 1 sends a request message for establishing wireless communication with the second mobile terminal, and the wireless connection is established after the second mobile terminal 2 receives the request message.

Specifically, the first Bluetooth module 13 sends out the said file via the Bluetooth object push profile function.

The vCard decoding module 21 imports the contact information of the interpreted address book information one by one into the terminal or the SIM card (abbreviated from Subscriber Identity Module, also called a smart card or a user identification card) of the second mobile terminal 2. The said file is a vcf file.

In addition, on the premise of the above-mentioned disclosure of the method and system for transferring the address book information based on Bluetooth, in order to achieve a better effect in transferring the address book information, the first mobile terminal 1 can further perform the following procedures:

1, deleting the vcf file which is previously stored in the first mobile terminal 1 for getting more storage space, and storing the exported vcf file, if the space of a memory card (if present) in the first mobile terminal is enough, then storing the exported vcf file in the memory card; otherwise, then storing it in memory of the first mobile terminal 1.

2, since the first mobile terminal 1 further stores the vcf file after sending out the vcf file, the user can further find out the vcf file via the first mobile terminal 1, for getting the contact information of the address book information contained in the vcf file.

Specifically, the user may find the vcf file from the files stored in the memory of the first mobile terminal 1 or the memory card installed in the first mobile terminal 1, and interpret the said file by using the vCard standard to obtain the contact information contained in the vcf file, and save the obtained contact information to the terminal or the SIM card of the first mobile terminal 1.

The present invention discloses a method and system for transferring an address book based on Bluetooth. First, the address book information stored in the terminal and the SIM card of the first mobile terminal 1 is exported as the said file according to the vCard standard, and the said file is transmitted to the second mobile terminal 2. After the second mobile terminal 2 receives the file, the said file is interpreted for obtaining the address book information of the first mobile terminal 1, so as to achieve the purpose of transferring the address book.

The method and system provided by the present invention utilize the Bluetooth function of the mobile terminal and transfer the address book information from a mobile terminal to another mobile terminal by means of the wireless communication, so that the transfer of the address book information is more convenient and efficient, thereby not only improving the user's experience of the mobile terminal but also providing convenience for the user's daily life.

The present invention simultaneously overcomes the processes of repeatedly installing the SIM card in the prior art, and not only improves the user experience of the mobile terminal but also provides convenience for the user's daily life.

It should be understood that applications of the present disclosure are not limited to what is described above. Those of ordinary skill in the art may make modifications or variations according to the above description, and all of these modifications and variations shall be covered within the scope of the attached claims of the present disclosure.

What is claimed is:

1. A system for transferring an address book based on Bluetooth, the system comprising a first mobile terminal and a second mobile terminal;

the first mobile terminal and the second mobile terminal having a Bluetooth module;

the first mobile terminal comprising an exporting module of a file format standard of electronic business cards, a first address book module, and a first Bluetooth module;

the second mobile terminal comprising a decoding module of the file format standard of electronic business cards, a second address book module, and a second Bluetooth module;

the exporting module of the file format standard of electronic business cards utilized to export address book information stored in the first address book module of the first mobile terminal as a file according to the file format standard of electronic business cards;

the first address book module utilized to store contact information of the first mobile terminal;

the first Bluetooth module utilized to establish a wireless connection with the second Bluetooth module for sending the exported file from the exporting module of the file format standard of electronic business cards to the second mobile terminal;

the second Bluetooth module utilized to receive the file transmitted from the first Bluetooth module;

the decoding module of the file format standard of electronic business cards utilized to parse the file received by the second mobile terminal according to the file format standard of electronic business cards, and to import the interpreted address book information into the address book of the second mobile terminal;

wherein the system further comprises a file storing and deleting module utilized to store the file in the first mobile terminal and to delete a history file of which a format thereof is identical to a format of the file from history files stored in the first mobile terminal, and wherein before the wireless connection is established between the first mobile terminal and the second mobile terminal, and after the first Bluetooth module is turned on, detection of a wireless signal of the second mobile terminal is preformed; and if the wireless signal is detected, then the wireless connection is established;

if not, then the first mobile terminal sends a request message for establishing a wireless communication with the second mobile terminal, and the wireless connection is established after the second mobile terminal receives the request message.

2. The system for transferring an address book based on Bluetooth according to claim 1, wherein the exporting module of the file format standard of electronic business cards comprises an export determining unit;

the export determining unit utilized to determine whether the file is exported successfully:

if the file is exported successfully, then sending the file;

if exporting of the file fails, then prompting a user whether to re-export the address book information, and then ending off the transfer of the address book information if the user chooses not to re-export.

3. The system for transferring an address book based on Bluetooth according to claim 1, wherein the Bluetooth module sends out the file via a Bluetooth object push profile manner.

* * * * *